United States Patent
Cournoyer et al.

(10) Patent No.: US 12,383,925 B2
(45) Date of Patent: Aug. 12, 2025

(54) SYSTEMS AND METHODS FOR MANAGING SHARP TRANSITIONS FOR POWDER COATING

(71) Applicant: Rivian IP Holdings, LLC, Irvine, CA (US)

(72) Inventors: Travis Cournoyer, Hawthorne, CA (US); Nathaniel Wynn, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/210,528

(22) Filed: Jun. 15, 2023

(65) Prior Publication Data

US 2023/0321685 A1 Oct. 12, 2023

Related U.S. Application Data (63) Continuation of application No. 16/933,114, filed on Jul. 20, 2020, now Pat. No. 11,731,160.

(51) Int. Cl.
*B32B 3/04* (2006.01)
*B05D 1/12* (2006.01)
(Continued)

(52) U.S. Cl.
CPC .............. *B05D 1/12* (2013.01); *B05D 1/325* (2013.01); *B32B 3/04* (2013.01); *B32B 15/043* (2013.01);
(Continued)

(58) Field of Classification Search
CPC ..... B32B 3/04; B32B 15/043; B32B 2255/06; B32B 3/02; B32B 7/05; Y10T 428/24777; Y10T 428/24752
See application file for complete search history.

(56) References Cited

U.S. PATENT DOCUMENTS 3,391,378 A * 7/1968 Fisher .................. H02G 5/08
439/212
4,981,451 A 1/1991 Undin et al.
(Continued)

FOREIGN PATENT DOCUMENTS

| CN | 106165114 A | 11/2016 |
| CN | 109950454 A | 6/2019 |
| CN | 110545984 A | 12/2019 |

OTHER PUBLICATIONS

"Green PET polyester mylar tapes"; Micron to Nano Innovative Microscopy Supplies; Mar. 26, 2017; <https://www.microtonano.com/Green-PET-polyester-mylar-tapes.php>. (Year: 2017).
(Continued)

*Primary Examiner* — Donald M Flores, Jr.
(74) *Attorney, Agent, or Firm* — Haley Guiliano LLP (57) ABSTRACT

An apparatus includes a component having an edge feature that has a radius of curvature. The apparatus includes an underlayer arranged over the edge feature and configured to increase the radius of curvature of the edge feature. The apparatus includes a powder coating arranged over the component and over the underlayer to form a continuous layer. The underlayer is configured to remain under the powder coating. The underlayer helps the powder coating achieve a more uniform thickness over the edge feature. The apparatus is formed by applying an underlayer to a first region of the component to form an underlaid component. The first region includes the edge feature. A powder coating is applied to the underlaid component. A masking layer may be applied to a region other than the first region, and after powder coating, the masking may be removed to expose a surface of the component.

18 Claims, 5 Drawing Sheets

(51) Int. Cl.
  *B05D 1/32* (2006.01)
  *B32B 15/04* (2006.01)
  *H01M 50/505* (2021.01)
  *H02M 3/00* (2006.01)
  *H02M 7/00* (2006.01)

(52) U.S. Cl.
  CPC ......... *H01M 50/505* (2021.01); *H02M 3/003* (2021.05); *H02M 7/003* (2013.01); *B32B 2255/06* (2013.01); *B32B 2457/10* (2013.01)

(56) References Cited

U.S. PATENT DOCUMENTS

| | | | | |
|---|---|---|---|---|
| 2004/0188064 | A1* | 9/2004 | Upadhya | F04B 17/00 |
| | | | | 257/E23.098 |
| 2004/0191555 | A1* | 9/2004 | Germano | B05D 7/53 |
| | | | | 428/327 |
| 2014/0318751 | A1* | 10/2014 | Kinder | F28D 1/05366 |
| | | | | 165/151 |
| 2014/0356692 | A1 | 12/2014 | Park et al. | |
| 2014/0374072 | A1* | 12/2014 | Seewald | F28D 1/0333 |
| | | | | 165/150 |
| 2015/0221973 | A1 | 8/2015 | Upaddhyaya et al. | |
| 2019/0063846 | A1* | 2/2019 | Bluetling | F28D 9/0093 |
| 2020/0038909 | A1* | 2/2020 | Bortell | C23C 18/54 |

OTHER PUBLICATIONS

"How to Powder Coat an Old Rusty Battery Tray"; Eastwood Chatter; Aug. 7, 2019; <https://garage.eastwood.com/eastwood-chatter/how-to-powder-coat-an-old-rusty-battery-tray/>. (Year: 2019).
"Masking and Bonding Solutions for Powder Coating Operations"; 3M (2017); <https://multimedia.3m.com/mws/media/14649420/masking-and-bonding-solutions-for-powder-coating-operations-hi-res.pdf>. (Year: 2017).
"Powder Coating vs. Resin Based"; TerraCast Products, Feb. 13, 2019; <https://www.terracastproducts.com/powder-coating-vs-resin-based-which-is-better-what-sets-them-apart/>. (Year: 2019).
"Why Masking is Necessary for Powder Coating and Which Masking Supplies to Use"; Powder Coating the Complete Guide; Aug. 2013; <https://www.powdercoatguide.com/2013/08/masking.html#YulFLbbMKck>. (Year: 2013).

* cited by examiner

SYSTEMS AND METHODS FOR MANAGING SHARP TRANSITIONS FOR POWDER COATING

CROSS-REFERENCE TO RELATED APPLICATIONS

This application is a continuation of U.S. patent application Ser. No. 16/933,114, filed Jul. 20, 2020, the disclosure of which is hereby incorporated by reference herein in its entirety.

INTRODUCTION

The present disclosure is directed to preparation for powder coating, and more particularly, to the use of an underlayer to improve powder coating.

SUMMARY

In some embodiments, the present disclosure is directed to an apparatus that includes a component, an underlayer, and a powder coating. The component includes at least one edge feature having a radius of curvature. The underlayer is arranged over the at least one edge feature and is configured to increase the radius of curvature of the at least one edge feature. The powder coating is arranged over the component and over the underlayer to form a continuous layer. The underlayer is configured to remain under the powder coating as a permanent, non-serviceable design feature.

In some embodiments, the component includes a cooling assembly formed from sheet metal, wherein the at least one edge feature comprises a joint at an edge of the sheet metal. For example, the component may include a cooling jacket of a battery module having sharp edges.

In some embodiments, the component further comprises a region that is exposed, wherein the region does not coincide with the underlayer. In some embodiments, the component includes a busbar, and the region is configured to be electrically coupled to an electrical circuit. For example, if the component is a busbar, in some embodiments, the underlayer is electrically insulative.

In some embodiments, the component includes one or more recess features, and the underlayer is arranged to cover the one or more recess features. For example, the powder coating need not penetrate into the recesses, but rather may coat the underlayer arranged over the recesses. For example, in some embodiments, the component includes a bracketing support such as a mounting bracket of a battery module.

In some embodiments, the underlayer includes a tape. For example, in some such embodiments, the tape includes a thermoset tape, a masking tape, a heat activated tape, any other suitable tape, or any combination thereof.

In some embodiments, the underlayer comprises a thickness selected to provide a predetermined spatial dimension of the apparatus.

In some embodiments, the component includes an electrically conductive material. For example, the component may be metal.

In some embodiments, the present disclosure is directed to an apparatus that includes more than one component. In some embodiments, the apparatus includes a first component, an underlayer, a powder coating, and a second component. The first component includes at least one edge feature having a radius of curvature, and is electrically conductive. The underlayer is arranged over the at least one edge feature and is configured to increase the radius of curvature of the at least one edge feature. The second component is arranged a distance from the first component is also electrically conductive. The powder coating is arranged over the first component and over the underlayer to form a continuous layer. The underlayer is configured to remain under the powder coating provides dielectric protection against shorting between the first component and the second component.

In some embodiments, the present disclosure is directed to a method for coating a component comprising an edge feature. The method includes applying an underlayer to a first region of the component to form an underlaid component, and applying a powder coating to the underlaid component to form a coated component. The first region includes the edge feature, which has a first radius of curvature. The underlayer forms a second radius of curvature at the edge feature larger than the first radius of curvature. The underlayer is configured to remain on the component under the powder coating.

In some embodiments, the underlaid component has an exterior surface, and the method includes preparing the exterior surface for the powder coating.

In some embodiments, the method includes applying a masking layer to a second region of the component. The first region and the second region do not overlap. In some embodiments, the method includes removing the masking layer after applying the powder coating to expose the second region of the component.

In some embodiments, applying the powder coating includes spraying a powder onto the underlaid component, and curing the powder to from the powder coating. Curing the powder coating includes increasing a temperature of the underlaid component to cause the underlayer to adhere more strongly to the component.

In some embodiments, applying the underlayer includes applying a tape to the first region. In some such embodiments, the tape includes a thermoset tape, a masking tape, a heat activated tape, any other suitable tape, or any combination thereof.

In some embodiments, the method includes selecting the underlayer based at least in part on a material of the component. In some embodiments, the method includes selecting the underlayer based at least in part on a desired electrical property of the coated component.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

A battery module may include components having sharp edges or transitions, for example, along sides and corners. As part of the manufacturing process, a component may be powder coated with an electrically insulative material. Powder coating typically results in a thinner layer of material being deposited along sharp transitions such as edges and corners. Such relatively thinner layers of material at these sharp transitions may fail to meet desired electrical insulative requirements. Further, because of edge effects, sharp transitions are more susceptible to electrical shorting. Although sharp transitions may be machined to make them less sharp, this machining can be time consuming and costly. Alternatively, additional powder coating material could be added to the object, but in some circumstances an overall thicker coating would negatively impact heat transfer properties of the component. After powder coating, application of an insulative material (e.g., Kapton tape or PET tape) to the sharp transitions may help provide insulation, but such materials can be costly and can peel away over time. In locations where the coating is thinner, pinholes, burrs poking through the coating, or other defects form and present potential failure locations. For example, aside from electrical isolation consideration, penetration of water, water and ethylene glycol (WEG) coolant, or volatile organic compounds (VOC) from vented cell contents through the coating may degrade both the part that is supposed to be coated for protection as well as the adhesion between the powder coating and the part itself. Degradation may include, for example, softening from water absorption, corrosion from exposure to salt and water (in the case of coating ferrous metals, common in battery packs), or acceleration of propagation of stress cracks at the powder coat—part interface. Accordingly, it is desirable to achieve proper insulative properties at sharp transitions without using excessive powder coating material or adding expensive insulative material afterwards.

Figure 1:
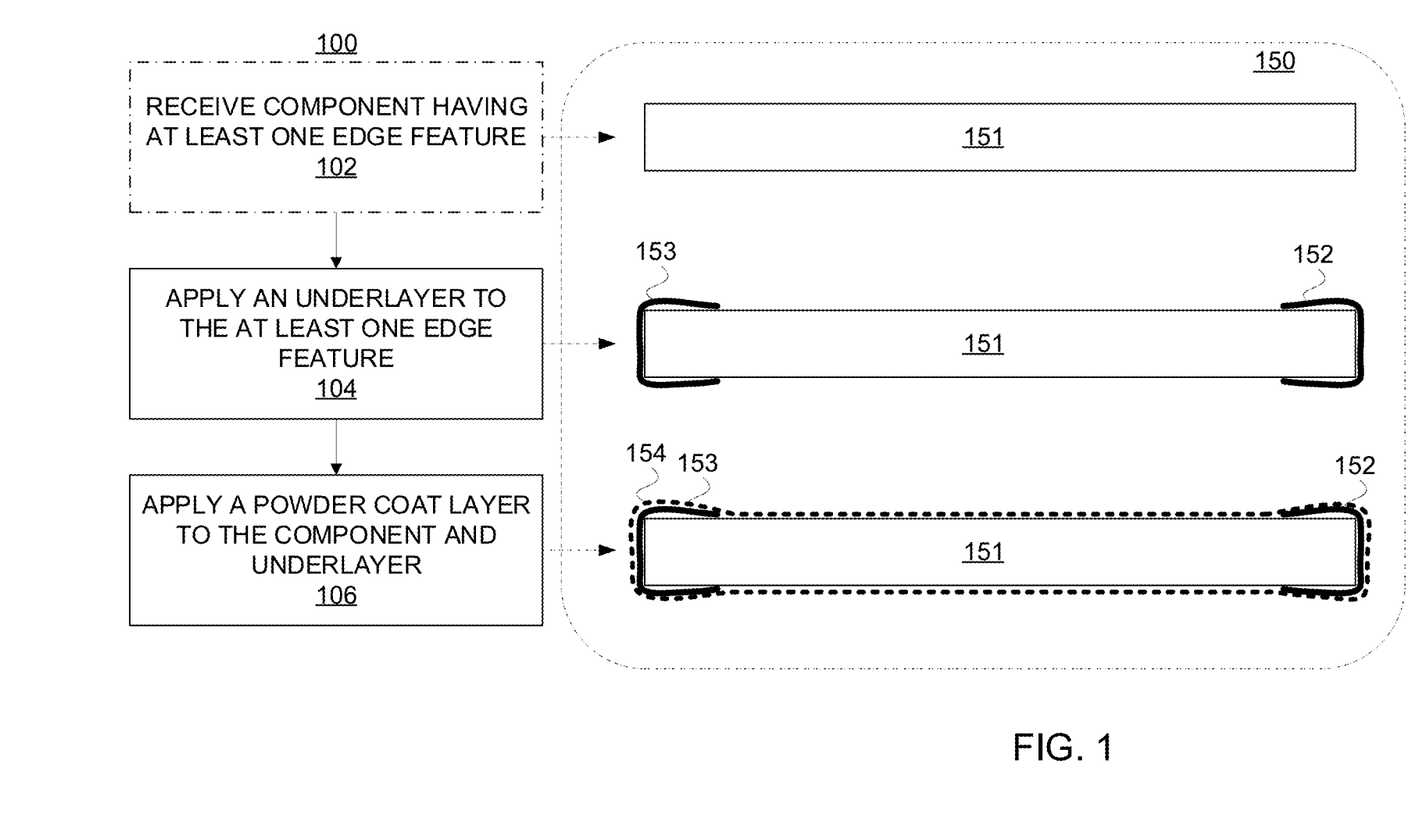
FIG. 1 shows a flowchart of an illustrative process for using an underlayer to improve powder coating, in accordance with some embodiments of the present disclosure.

FIG. 1 shows a flowchart of illustrative process 100 for using an underlayer to improve powder coating, in accordance with some embodiments of the present disclosure. Panel 150 illustrates process 100 based on illustrative component 151. In an illustrative example, process 100 includes applying a masking tape to any sharp transitions of an object, powder coating the object, and leaving the masking tape on the object (e.g., while the object is used as intended).

Step 102 includes receiving a component (e.g., component 151) having at least one edge feature (e.g., corners of component 151). The component may include a cooling component (e.g., a cooling plate or cooling jacket), a busbar (e.g., a terminal busbar of a battery pack), a sidewall or mounting bracket of a battery pack, any other suitable component having an edge feature, or any combination thereof. Step 102 may include arranging the component (e.g., in a holder, fixture, or stand), selecting the component (e.g., based on part number, serial number, or type), preparing the component (e.g., grinding, sanding, etching, cleaning, or applying any other suitable preparation), any other suitable action, or any combination thereof.

Step 104 includes applying an underlayer to the at least one edge feature. The underlayer (e.g., shown by layers 152 and 153) may include a tape such as, for example, a masking tape, a thermoset tape (e.g., having a thermosetting epoxy embedded), a heat-activated tape, any other suitable tape, or any combination thereof. The underlayer may be electrically conductive, dielectric, thermally conductive, thermally insulative, or any suitable combination thereof. The underlayer may have any suitable thickness profile. For example, an underlayer may have a uniform thickness, a varying or tapered thickness, or a combination thereof. In some embodiments, step 104 includes selecting the underlayer based on the component received at step 102.

Step 106 includes applying a powder coat (e.g., shown by coating 154) to the component and underlayer. Applying the powder coat may include preparing the exposed surface, spraying a powder on the component and underlayer, and curing the powder to form an overlayer. Preparing the exposed surface may include blasting with air to remove particles, blasting with particles to abrade the exposed surface, washing or other cleaning, plasma treating, performing any other suitable action to prepare for spraying, or any combination thereof.

In an illustrative example, process 100 provides an improved powder coating process for coating sharp transitions, resulting in a more consistent coating thickness and improved electrical insulative properties. Process 100 includes using a masking tape in an unconventional manner. For example, a masking tape is typically used to prevent a powder coating from being applied to a portion of the object. For example, if an object comprises a window portion, masking tape could be used to protect that region during powder coating. The power coating will flow over the masking tape during electrospray of the powder and gelling, and is then removed from the window portion (e.g., the tape is peeled off the object after the coating has hardened via a curing process). The present disclosure makes use of a masking tape in a different manner, to enable the object to receive a more consistent powder coating layer in the desired area where the masking tape is applied (e.g., over the sharp transition such as an edge feature). In conventional uses, the tape is necessarily removed to expose the object surface, which is free from a powder coated layer, and the tape would hinder any further processing of the surface if left in place.

As illustrated, component 151 includes a rectangular shape having 4 sharp corners. Tape is applied to form layers 152 and 153 (e.g., underlayers), by wrapping the tape around the edges and extending a short distance along the top and bottom surfaces. Component 151 is then powder coated to form coating 154. Layers 152 and 153 smooth out the sharp corners of component 151, which enables coating 154 to maintain a sufficient thickness around the edges, which provides several benefits. For example, coating 154 allows component 151 to exhibit sufficient electrical insulative properties at the sharp transitions. Further, by powder coating over the entirety of layers 152 and 153 and the boundary where layers 152 and 153 end (e.g., and the exposed surface of component 151 begins), layers 152 and 153 are encapsulated under the powder coating, which prevents layers 152 and 153 from peeling away later during use of component 151 as coated. Further, the use of an underlayer (e.g., layers 152 and 153) may reduce manufacturing cost by eliminating the use of more expensive insulators applied over coating 154, such as Kapton or PET tape. For example, because layers 152 and 153 allow better coating at the corners, any tape applied over coating 154 does not need to be electrically insulative to mitigate thinner coating regions (e.g., as would be required if layers 152 and 153 were not present).

Features of a component may have a corresponding radius of curvature. For example, edges of component 151 may include a relatively small radius of curvature, and thus may be susceptible to a thinned powder coating at those edges. In general, sharper features will exhibit a lesser radius of curvature (e.g., an extremely sharp corner has a radius of curvature approaching zero), and smoother features will exhibit a greater radius of curvature (e.g., a substantially flat surface has a radius of curvature approaching infinity). A radius of curvature, as used herein, may refer to a local radius of curvature, a range of radii of curvature, an effective radius of curvature, an average radius of curvature, any other suitable metric corresponding to sharpness, or any combination thereof.

In an illustrative example, in some embodiments, a tape used to form layers 152 and 153 may have relatively weak adhesion to metals (e.g., such as painter's tape) so that it can be peeled off the part after powder coating. In some embodiments, layers 152 and 153 are formed using tapes that exhibit good adhesion to metals for permanent bonding. In some embodiments, applying coating 154 includes baking at an elevated temperature, which may melt the tape at least partially. In some circumstances, melting makes it adhere more strongly to the surface of component 151, thus making peeling off of layers 152 and 153 more difficult (e.g., which is preferred to render the underlayer more permanent and robust).

Component 151 may include any suitable type of component, as process 100 is especially useful with any component having edge features or other sharp transitions. Further, an underlayer such as layer 152 or 153 may applied to regions without a sharp transition to modify a spatial dimension of a coated component, assist in transitioning a coating thickness across features of component 151, or a combination thereof. In an illustrative example, process 100 may be applied to a metal or otherwise electrically conductive component for which a sufficient powder coating layer thickness is required at one or more sharp transitions. For example, process 100 may be applied to electrically conductive components having edges (e.g., machined or stamped) that are used near high voltage (e.g., a DC bus or power electronics system).

The use of an underlayer may minimize other otherwise reduce the amount of powder coating material needed to achieve a desired electrical insulative property. Further, the use of an underlayer may eliminate or otherwise reduce machining and processing steps to soften sharp transitions. Further, the use of an underlayer may eliminate or otherwise reduce the need for more expensive insulative tape layers over the powder coating layer. Further, application of an underlayer allows a more uniform resulting coated component in terms of thickness. For example, a uniform surface is more amenable to gluing or adhering of additional components during assembly.

Figure 2:
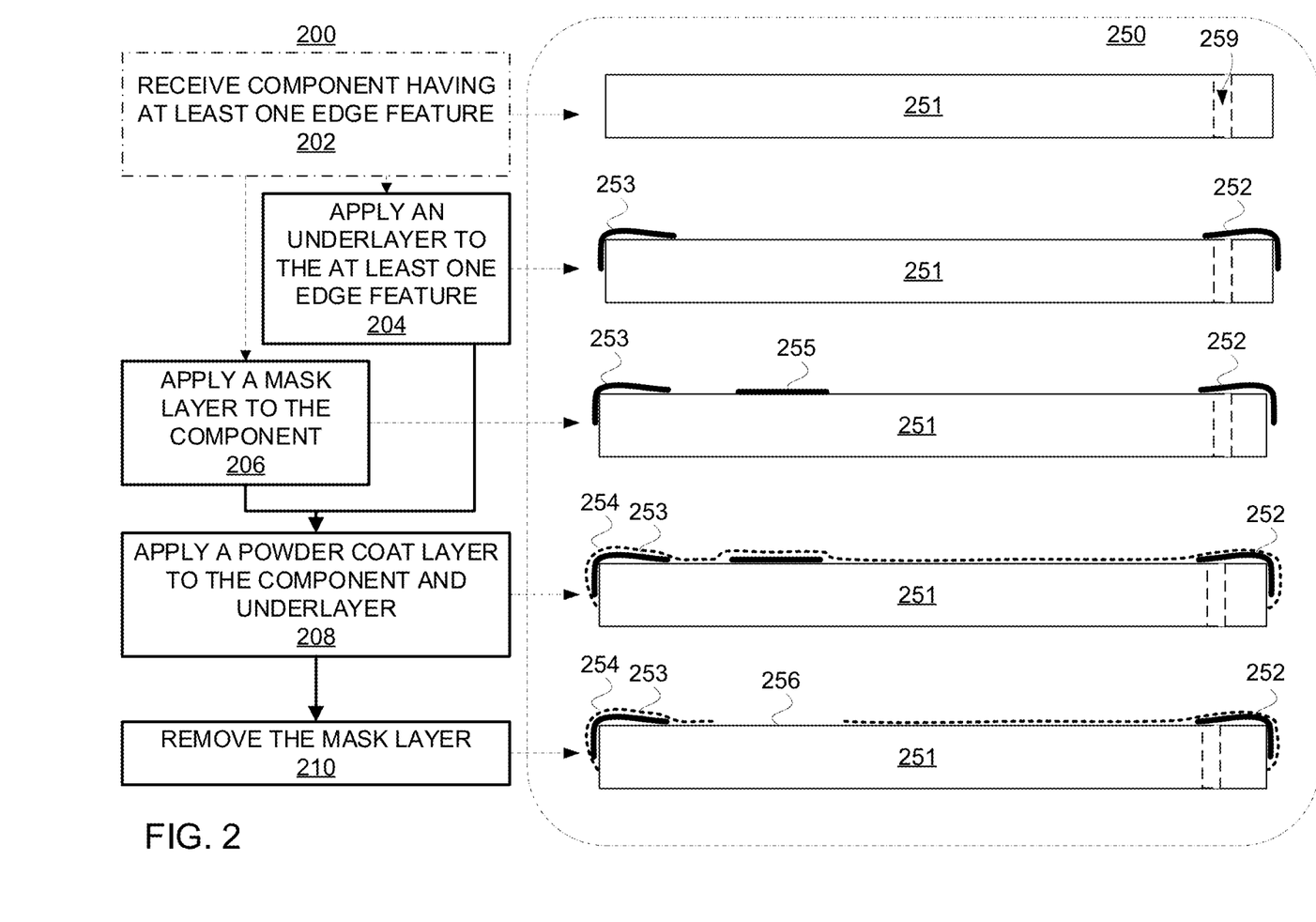
FIG. 2 shows a flowchart of an illustrative process for using an underlayer and mask to improve powder coating, in accordance with some embodiments of the present disclosure.

FIG. 2 shows a flowchart of illustrative process 200 for using an underlayer and mask to improve powder coating, in accordance with some embodiments of the present disclosure. Panel 250 illustrates process 200 based on illustrative component 251. In an illustrative example, process 200 includes applying a masking tape to any sharp transitions and recesses of an object, powder coating the object, and leaving some of the masking tape on the object and removing some of the masking tape to expose the object (e.g., while the object is used as intended).

Step 202 includes receiving a component (e.g., component 251) having at least one edge feature (e.g., corners of component 251). The component may include a cooling component (e.g., a cooling plate or cooling jacket), a busbar (e.g., a terminal busbar of a battery pack), a sidewall or battery module mounting bracket of a battery pack, any other suitable component having an edge feature, or any combination thereof. Step 202 may include arranging the component (e.g., in a holder, fixture, or stand), selecting the component (e.g., based on part number, serial number, or type), preparing the component (e.g., grinding, sanding, etching, cleaning, or applying any other suitable preparation), any other suitable action, or any combination thereof.

Step 204 includes applying an underlayer to the at least one edge feature. The underlayer (e.g., shown by layers 252 and 253) may include a tape such as, for example, a masking tape, a thermoset tape (e.g., having a thermosetting epoxy embedded), a heat-activated tape, any other suitable tape, or any combination thereof. The underlayer may be electrically conductive, dielectric, thermally conductive, thermally insulative, or any suitable combination thereof. The underlayer may have any suitable thickness profile. For example, an underlayer may have a uniform thickness, a varying or tapered thickness, or a combination thereof. In some embodiments, step 204 includes selecting the underlayer based on the component received at step 202. As illustrated, an underlayer may be applied to a recess feature of component. For example, as illustrated, layer 252 is applied to cover through recess 259 (e.g., a through hole) on one face, in addition to edge features of component 251. In some embodiments, an underlay is applied to a recess feature to ensure a more uniform coating is applied to ensure a smoother radius of curvature at the location of the recess feature.

Step 206 includes applying a mask layer (e.g., layer 255 as illustrated) to the component. Layer 255 is configured to be removed after powder coating, to expose a surface of component 251 that is not powder coated. To illustrate, the mask layer may be the same material as the underlayer, or may be a different material. For example, in some embodiments, the mask layer and the underlayer include the same material, with one difference being that the mask layer is to be removed after coating. In a further example, in some embodiments, the mask layer and the underlayer include a different material (e.g., the mask layer being relatively easier to remove after coating 254 is formed).

Step 208 includes applying a powder coat (e.g., shown by coating 254) to the component and underlayer. Applying the powder coat may include preparing the exposed surface, spraying a powder on the component and underlayer, and curing the powder to form an overlayer. Preparing the exposed surface may include blasting with air to remove particles, blasting with particles to abrade the exposed surface, washing or other cleaning, plasma treating, performing any other suitable action to prepare for spraying, or any combination thereof. As illustrated, the powder coat is applied on one side of component 251 (e.g., the other side may be used for mounting or otherwise interfacing). In some embodiments, through recess 259, or any other suitable recess, may be left open on or along at least one side to prevent a gas pocket from forming during the powder coating process.

Step 210 includes removing the mask layer from the component. In some embodiments, for example, after coating 254 is applied, layer 255 is removed to expose component 251. Layers 252 and 253 remain in place when layer 255 is removed. For example, process 200 may be used to ensure a more uniform coating 254 at the edges of component 251, while allowing region 256 of component 251 to remain uncoated for further processing (e.g., for interfacing to another component). As another example, process 200 may be used to apply a uniform coating over through recess 259. Without using layer 252 over through recess 259, the inner sides of the recess would have a thinner coating layer or no coating at all and fail design requirements. Any suitable combination of underlayers and masking layers may be used in accordance with the present disclosure.

Figure 3:
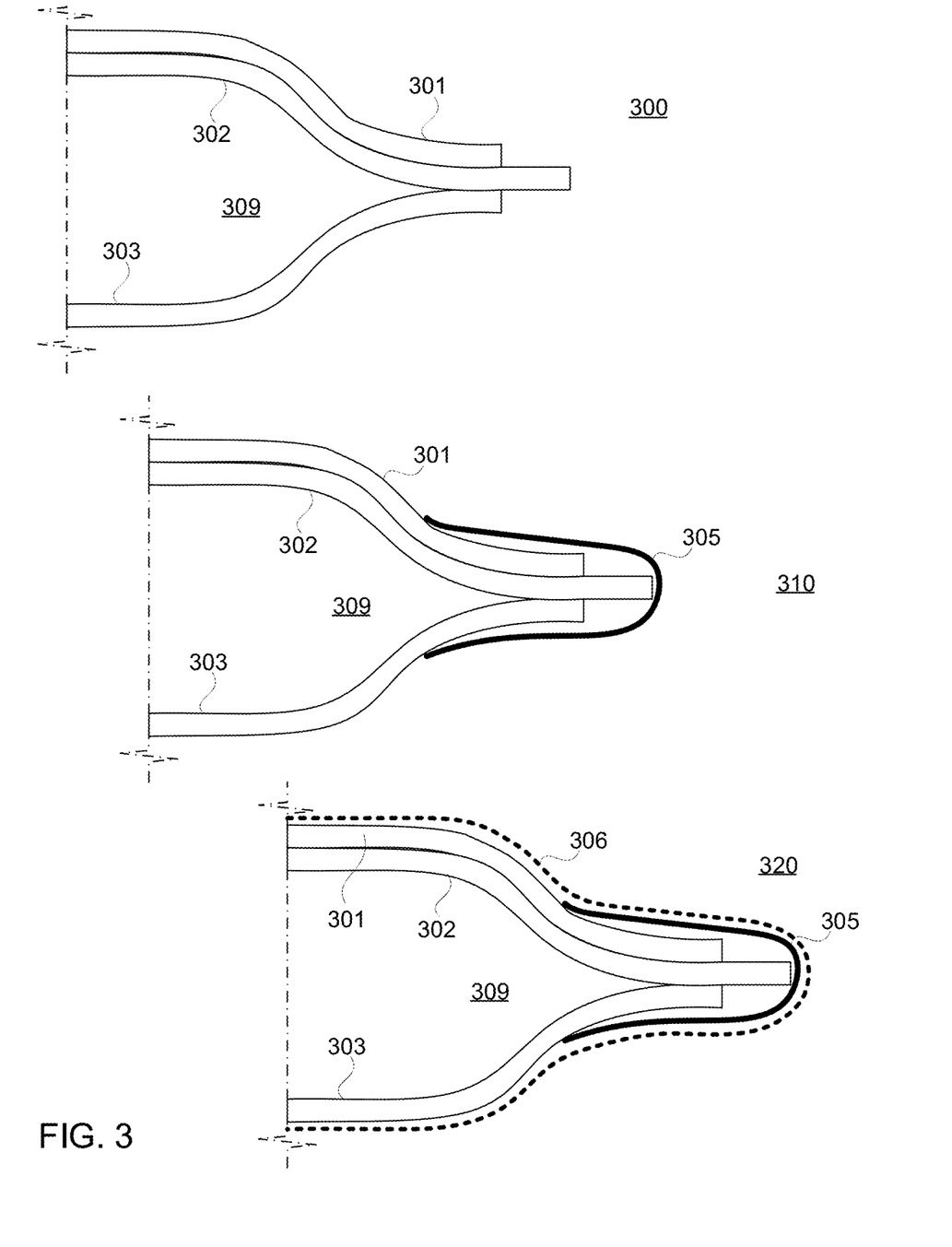
FIG. 3 shows stages of layering and coating an illustrative cooling assembly, in accordance with some embodiments of the present disclosure.

FIG. 3 shows stages of layering and coating illustrative cooling assembly 300, in accordance with some embodiments of the present disclosure. As illustrated, cooling assembly 300 includes three plates 301, 302, and 303, which are assembled to form cooling channels (e.g., one of which is cooling channel 309, as illustrated in FIG. 3). For example, plates 301, 302, and 303 may be brazed to form cooling assembly 300. As illustrated, cooling assembly 300 includes a region having sharp transitions where the ends of plates 301, 302, and 303 come together (e.g., on the right side, as illustrated).

Layer 305 is applied to cooling assembly 300 to cover edge features of cooling assembly 300, thus forming underlaid assembly 310. In some embodiments, for example, the size, thickness, and type of material used to form layer 305 is determined based on component 300 (e.g., a radius of curvature, material), a desired resulting assembly (e.g., resulting radius of curvature), an expected electrical environment, a desired profile for coating, any other suitable criterion, or any combination thereof.

Coating 306 is applied to underlaid assembly 310 to form powder coated assembly 320. If layer 305 were not in place, coating 306 would not be expected to be as uniform at the sharp transitions of component 300. Further, layer 305 may provide electrical insulation as well, in some circumstances (e.g., when powder coated assembly 320 is to be arranged near metal components, a DC bus, or other potential circuits). In some embodiments, layer 305 may extend further along plates 301 and 303 to reduce the potential for peeling and corresponding failure modes.

Figure 4:
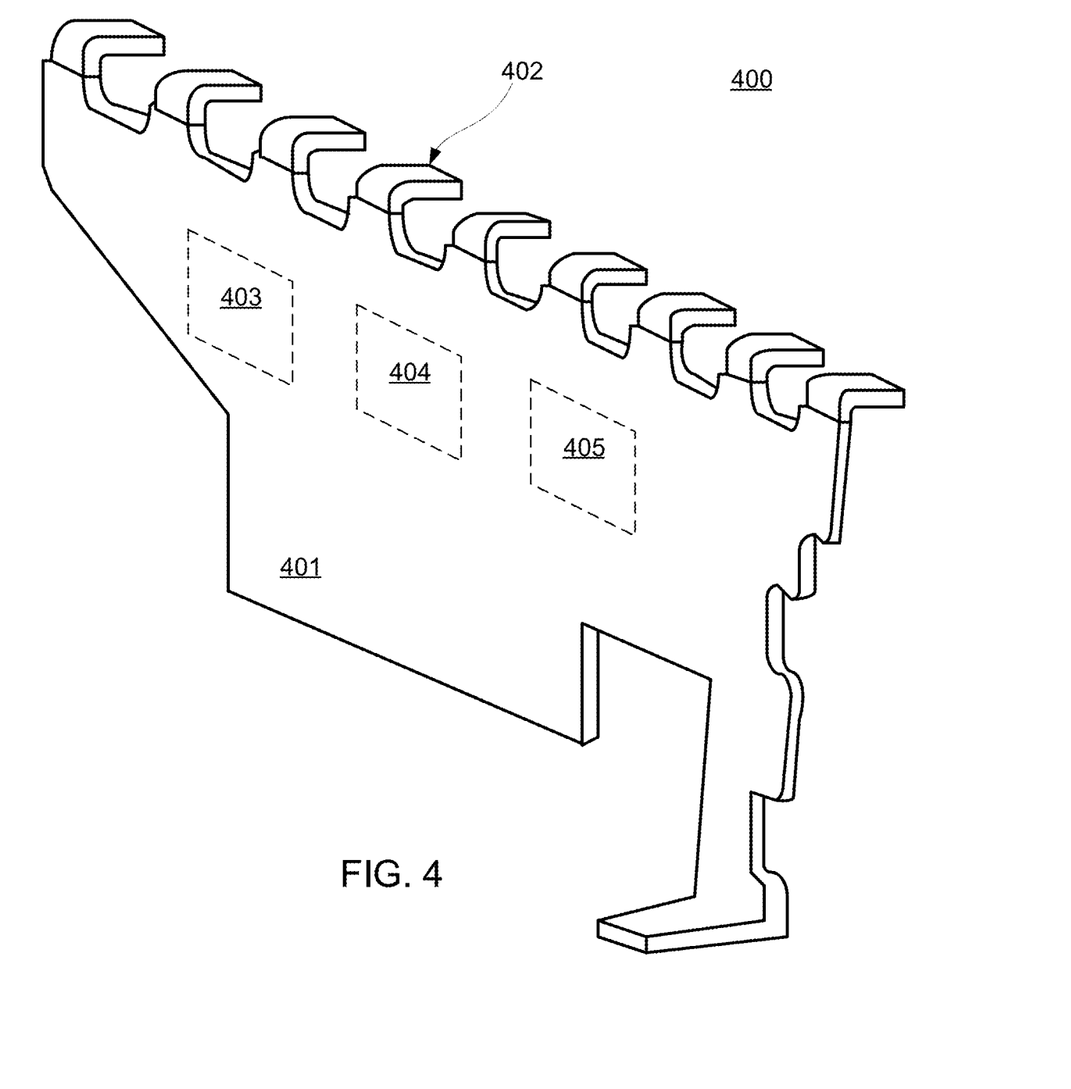
FIG. 4 shows a perspective view of an illustrative busbar, which has been powder coated, in accordance with some embodiments of the present disclosure.

FIG. 4 shows a perspective view of illustrative busbar 400, which has been powder coated, in accordance with some embodiments of the present disclosure. Busbar 400 is configured to be included in a battery system (e.g., of an electric vehicle), and thus requires some electrical insulation. As illustrated, busbar 400 includes powder coated region 401, and exposed tabs 402. Exposed tabs 402 are configured to be electrically coupled to one or more current collectors, and thus are not powder coated. For example, exposed tabs 402 may be formed by process 200 of FIG. 2 (e.g., particularly steps 206 and 210 thereof). Recesses 403, 404, and 405 are covered by an underlayer and a subsequent powder coating. Further, busbar 400 may include an underlayer at any suitable edge feature, recess, flat area, or a combination thereof to allow a more uniform powder coating thickness, improved electrical isolation, or both. In an illustrative example, recesses 403, 404, and 405 may allow mounting of additional components, clearance for other components, weight reduction, mounting locations (e.g., during manufacturing), or a combination thereof.

Figure 5:
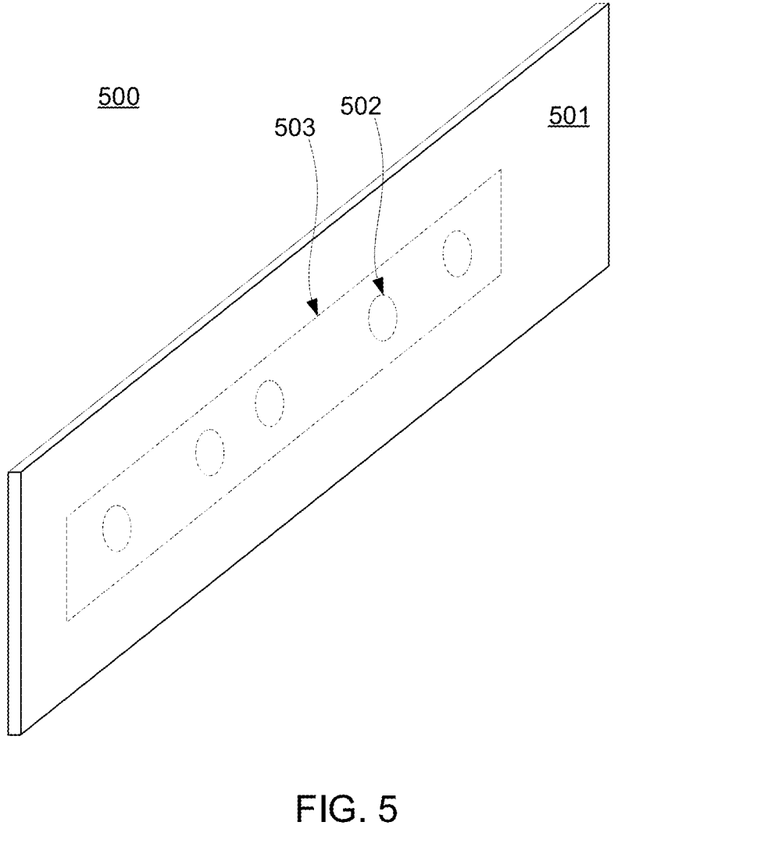
FIG. 5 shows an illustrative mounting bracket, which has been powder coated, in accordance with some embodiments of the present disclosure.

FIG. 5 shows an illustrative mounting bracket 500, which has been powder coated, in accordance with some embodiments of the present disclosure. Mounting bracket 500 (e.g., which may include a shear wall or other structural support) is configured to be included in a battery system (e.g., of an electric vehicle), to provide structural support, and thus requires some electrical insulation. As illustrated, mounting bracket 500 includes powder coated region 501, which covers an underlayer 503. Underlayer 503 covers recesses 502, such that after powder coating no exposed or thinly covered areas are present. For example, coated mounting bracket 500 may be formed by process 100 of FIG. 1, wherein the underlayer is applied to sharp transitions of recess features. Further, mounting bracket 500 may include an underlayer at any suitable edge feature, recess, flat area, or a combination thereof to allow a more uniform powder coating thickness, improved electrical isolation, or both.

Using an underlayer over recess features may provide additional benefits. In some embodiments, recesses 502 may have been added to mounting bracket 500 for weight saving purposes. In addition to creating sharp edges, the recesses may cause other problems in the manufacturing process. For example, in some embodiments, mounting bracket 500 is secured to a battery module using an adhesive. However, the added recesses create paths through which the adhesive can spread during assembly and curing. Accordingly, by using underlayer 503 over recesses 502, this provides an additional benefit of blocking paths through which the adhesive can spread.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A cooling assembly, comprising:
    a first plate, a second plate, and a third plate assembled to form cooling channels, wherein:
        the second plate is between the first plate and the third plate;
        an end portion of each of the first plate, the second plate, and the third plate comprises an edge and a portion immediately adjacent to the edge;
        the end portions of the first plate and the third plate interface with the second plate and the edge of the second plate extends beyond the edges of the first plate and the third plate; and
        at least one of the cooling channels is formed with the second plate and the third plate.

2. The cooling assembly of claim 1, wherein the second plate interfaces with the first plate where the at least one cooling channel is formed.

3. The cooling assembly of claim 1, wherein the first plate, the second plate, and the third plate are brazed to form the cooling assembly.

4. The cooling assembly of claim 1, wherein the end portions of the first plate, the second plate, and the third plate comprise sharp transitions.

5. The cooling assembly of claim 1, further comprising an underlayer arranged over the end portions of the first plate, the second plate, and the third plate.

6. The cooling assembly of claim 5, further comprising a powder coating arranged over the cooling assembly and over the underlayer to form a continuous layer, wherein the underlayer is configured to remain under the powder coating when the cooling assembly operates to provide cooling.

7. The cooling assembly of claim 5, wherein the underlayer is electrically insulative.

8. The cooling assembly of claim 5, wherein the underlayer is arranged to cover the edges of the first plate, the second plate, and the third plate and increase a radius of curvature of each of the edges.

9. A cooling assembly, comprising:
 a first plate, a second plate, and a third plate assembled to form cooling channels, wherein:
  the second plate is between the first plate and the third plate; and
  end portions of the first plate, the second plate, and the third plate come together to form a three-plate contiguous stack, with an edge of the end portion of the second plate extending beyond edges of the end portions of the first plate and the third plate.

10. The cooling assembly of claim 9, wherein the first plate, the second plate, and the third plate are brazed to form the cooling assembly.

11. The cooling assembly of claim 9, wherein the end portions of the first plate, the second plate, and the third plate comprise sharp transitions.

12. The cooling assembly of claim 9, further comprising an underlayer arranged over the end portions of the first plate, the second plate, and the third plate.

13. The cooling assembly of claim 12, further comprising a powder coating arranged over the cooling assembly and over the underlayer to form a continuous layer, wherein the underlayer is configured to remain under the powder coating when the cooling assembly operates to provide cooling.

14. The cooling assembly of claim 12, wherein the underlayer is electrically insulative.

15. A method for assembling a cooling assembly, comprising:
 assembling a first plate, a second plate, and a third plate to form cooling channels, wherein:
  the second plate is between the first plate and the third plate;
  an end portion of each of the first plate, the second plate, and the third plate comprises an edge and a portion immediately adjacent to the edge;
  the end portions of the first plate and the third plate interface with the second plate and the edge of the second plate extends beyond the edges of the first plate and the third plate; and
  at least one of the cooling channels is formed with the second plate and the third plate; and
 brazing the first plate, the second plate, and the third plate to form the cooling assembly.

16. The method of claim 15, wherein the second plate interfaces with the first plate where the at least one cooling channel is formed.

17. The method of claim 15, further comprising applying an underlayer over the end portions of the first plate, the second plate, and the third plate.

18. The method of claim 17, further comprising applying a powder coating to the underlayer to form a coated cooling assembly, wherein the underlayer is configured to remain during operation of the cooling assembly.

\* \* \* \* \*